United States Patent [19]

Merz et al.

[11] Patent Number: 4,983,782

[45] Date of Patent: Jan. 8, 1991

[54] PROCESS FOR TREATING WASTES AND THE LIKE BY LOW TEMPERATURE CARBONIZATION AND FURTHER PROCESSING OF THE LOW TEMPERATURE CARBONIZATION OIL

[75] Inventors: Ludwig Merz, Recklinghausen; Klaus Niemann, Oberhausen; Hans-Peter Wenning, Raesfeld, all of Fed. Rep. of Germany

[73] Assignee: Veba Oel Entwicklungs-Gesellschaft mbH, Gelsenkirchen, Fed. Rep. of Germany

[21] Appl. No.: 315,856

[22] Filed: Feb. 27, 1989

[30] Foreign Application Priority Data

Feb. 27, 1988 [DE] Fed. Rep. of Germany ....... 3806365

[51] Int. Cl.$^5$ .......................... C07C 1/00; C07C 5/00
[52] U.S. Cl. .................................. 585/240; 585/241; 585/242; 585/254
[58] Field of Search ................. 585/240, 241, 242, 254

[56] References Cited

U.S. PATENT DOCUMENTS

| | | | |
|---|---|---|---|
| 3,090,820 | 5/1963 | Walker | 585/240 |
| 4,266,083 | 5/1981 | Huang | 585/240 |
| 4,308,411 | 12/1981 | Frankiewicz | 585/240 |
| 4,526,675 | 7/1985 | Mahoney et al. | 585/240 |
| 4,652,686 | 3/1987 | Coenen et al. | 585/240 |
| 4,708,641 | 11/1987 | Meininger | 432/72 |
| 4,851,107 | 7/1989 | Kretschmar et al. | 208/108 |

Primary Examiner—Curtis R. Davis
Attorney, Agent, or Firm—Oblon, Spivak, McClelland, Maier & Neustadt

[57] ABSTRACT

Liquid phase hydrogenation of the liquid products of the low temperature carbonization of waste yields products which are free of polycyclic aromatic hydrocarbons and chlorinated hydrocarbons. The hydrogenation may be catalyzed by the low temperature coke produced in the low temperature carbonization.

24 Claims, No Drawings

PROCESS FOR TREATING WASTES AND THE LIKE BY LOW TEMPERATURE CARBONIZATION AND FURTHER PROCESSING OF THE LOW TEMPERATURE CARBONIZATION OIL

BACKGROUND OF THE INVENTION

1. Field of the Invention:

The present invention relates to a process for treating wastes by liquid phase hydrogenation in the presence of a catalyst or additive of the liquid products, as well as low temperature tar and low temperature coke, which are obtained by the low temperature carbonization of wastes such as plastic waste, hydrocarbon-loaded residues, contaminated soil, biomasses, sludge and the like;

2. Discussion of the Background:

The low temperature pyrolysis of household garbage, industrial and commercial waste, and special waste in a suitable reactor, e.g., a rotary kiln is known (cf. DE-PS 29 17 293, EP 0 111 081). Depending on the operating parameters of the plant and the materials that are used, the products of pyrolysis are low temperature gas, coke, oil, or tar.

Depending on the kind and origin of the waste products to be carbonized, the low temperature products contain a wide variety of pollutants.

In addition to the so-called system-inherent pollutants, which are already contained in the waste products prior to carbonization, special attention must be paid to the process specific pollutants. Under the reducing conditions of the low temperature carbonization process, in addition to the major components (hydrogen, carbon monoxide, carbon dioxide, methane and water), hydrogen compounds such as ammonia, hydrogen sulfide, hydrogen cyanide, hydrogen chloride, and hydrogen fluoride as well as among others $NO_x$ and sulfur dioxide occur. The gaseous pollutants can be trapped by adding basic slagging materials such as lime, and they then remain primarily in the low temperature coke (cf. EP 0 111 081).

Depending on the operating parameters of the low temperature carbonization process and the substances that are used, polycyclic aromatic hydrocarbons, in particular polychlorinated dibenzodioxines and polychlorinated dibenzofurans, can also occur. When the low temperature gases cool, these substances condense with other formed aromatic and phenolic hydrocarbons. In order to remove the sulfur vapors from the pollutants thus-obtained and to make them useful for further applications, usually one or more process steps are added to the pyrolysis process for treating the low temperature products.

A portion of the low temperature gas is usually used as the heating gas in the low temperature carbonization process. For this purpose the low temperature gas is first treated in a gas converter in such a manner that it is partially oxidized and dissociated above a red hot bed of coals at 1200° C. (cf. DE-OS 33 17 977). The pyrolysis gases, which are combusted to flue gases and which are not necessary for heating purposes, are purified and released by means of a chimney (cf. EP-0 111 081). In another process the pyrolysis follows a cracking reactor which is heated by means of electric resistance heating (cf. DE-PS 29 35 669). In DE-OS 34 12 582, a gas converter following the low temperature step is described.

Another process for treating low temperature products arising from the pyrolysis of waste is treatment in a melting chamber in which high temperature combustion occurs (cf. DE-OS 36 05 693).

According to DE-PS 29 17 293, low temperature gases, which are obtained from the pyrolysis of old tires, old cables, or plastics, are subjected to a further heat treatment at from 900° K. to 1200° K. in a tube bundle reactor. In the subsequent condensation step, an aromatic-rich oil is obtained that can be used as chemical and mineral oil raw material.

Depending on the kind and composition of the waste material to be carbonized, the pyrolysis process is subject to modified demands. The efficiency of these processes must always be regarded in relation to their environmental compatibility. Minimizing the release of heavy metals, acidic gases and polycyclic chlorinated hydrocarbons requires a high engineering cost. Especially with heterogeneous waste, the products of pyrolysis can usually be used only for energy. The recovery of valuable chemicals has come under consideration from an economical point of view only for specific kinds of special waste such as old tires (cf. DE-OS 24 62 495).

Thus, there remains a need for an inexpensive process for treating wastes which does not result in the release of pollutants such as polycyclic hydrocarbons or chlorinated hydrocarbons into the environment and allows the recovery of usable products.

SUMMARY OF THE INVENTION

Accordingly, it is one object of the present invention to provide a novel process for treating specific problem wastes.

It is another object of the present invention to provide a novel process for treating wastes which does not result in the release of polycyclic hydrocarbons or chlorinated hydrocarbons to the environment.

It is a further object of the present invention to provide a novel process for treating wastes which does not require expensive measures to prevent the release of polycyclic hydrocarbons or chlorinated hydrocarbons to the environment.

These and other objects, which will become apparent in the course of the following detailed description, have been achieved by liquid-phase hydrogenating the liquid products, as well as low temperature tar and low temperature coke, obtained by the low temperature carbonization of wastes, in the presence of 0.5 to 5% by weight of a catalyst or carrier, based on the total weight of the hydrogenation mixture, under a hydrogen pressure of 20 to 325 bar, at a temperature of 250 to 500° C., and a gas to oil ratio of 100 $Nm^3/t$ to 3,000 $Nm^3/t$.

DETAILED DESCRIPTION OF THE PREFERRED EMBODIMENTS

The present process is particularly suited for treating soil contaminated with chemicals or old oil, wastes such as plastic and cable wastes, biomasses, and industrial sludge such as paint sludges from the automobile industry.

The waste substances to be treated are fed into the low temperature carbonizing drum following an optional heating in a preheater. The low temperature carbonizing may be carried out by direct heating. Alternatively, in a preferred embodiment, the drum is heated indirectly by means of the drum walls. Flue gas, which is generated by combustion of the low temperature gases obtained from the low temperature carbonization, usually serves as the heating gas.

Basic additions, such as lime, can also be added to the feedstock in order to trap the acidic gases formed during the low temperature carbonization process. The quantity and nature of the formed or released acidic gases depends on the kind of feedstock. Among others, $SO_2$, $NO_x$, and HCl, when chlorine-containing wastes are treated, can occur.

Following the partial condensation of the low temperature vapors discharged from the low temperature carbonizing drum, a low temperature oil or tar and a non-condensable low temperature gas fraction are obtained. The polycyclic aromatic hydrocarbons and asphalts, which are formed during the low temperature carbonization process, and the polychlorinated aromatics, which form in the presence of chlorine, are contained in the condensate.

The low temperature coke is drawn off directly from the low temperature carbonizing drum. It is largely free of organic material and is not leachable with water.

The thus-obtained low temperature oil or tar is fed into the liquid phase reactor, following heat exchange with the process stream off from the liquid phase hydrogenation that is obtained after the residue-containing fraction has been removed.

The liquid phase hydrogenation is conducted at a hydrogen pressure ranging from 20 bar to 325 bar, preferably 150 to 200 bar, a temperature ranging from 250° C. to 500° C., preferably 400 to 490° C., more preferably 430 to 480° C., and a gas to oil ratio of 100 $Nm^3/t$ to 3000 $Nm^3/t$.

In a preferred embodiment, the low temperature coke that is obtained during pyrolysis is added to the liquid phase hydrogenation as a one-way catalyst in a quantity ranging from 0.5% by weight to 5% by weight, based on the total weight of the reaction mixture. By one-way catalyst, it is meant that the catalyst leaves the liquid phase hydrogenation reactor together with the reaction products. The separation of the catalyst from the reaction products is effected in the hot separator. Thus, the one-way catalyst is not retained in the reactor and is not required to be recycled. The indigeneous low temperature coke generated in the low temperature pyrolysis step is particularly preferred, because, insofar as it is not leachable, it is especially advantageous in regard to the safe disposal of the material.

If the wastes to be treated contain heavy metals, the carbon-containing, surface-rich material, which is obtained during the pyrolysis of the waste substances, is already loaded with the heavy metals. Alternatively, if necessary, the catalyst may be saturated with heavy metal solutions in order to increase its catalytic effectiveness.

Alternatively, brown coal coke obtained from a separate process may be added either instead or in addition to the low temperature coke. Other suitable extraneous catalysts for the hydrogenation, which are not generated in the low temperature carbonization, are described in copending U.S. Patent Applications, Ser. Nos. 07/105,290, now U.S. Pat. No. 4,851,107, and 07/172,225, now U.S. Pat. No. 4,941,966, filed on Oct. 7, 1987 and Mar. 23, 1988, respectively, and incorporated herein by reference, and include red mud, iron oxides, iron ores, hard coals, lignites, cokes from hard coals, lignites impregnated with heavy metal salts, carbon black, soots from gasifiers, cokes produced from hydrogenation, virgin residues, high surface area suspended solids containing carbon, electrostatic filter dusts, and cyclone dusts.

The hydrogenated product, leaving the liquid phase reactor, is removed in a conventional manner by means of a hot separator which is kept at the reaction pressure and at a temperature that is lowered by preferably 20° C. to 50° C. with respect to the reaction temperature. From this hot separator, the noncondensed hydrocarbons are drawn off at the top, and the residue-containing liquid products are drawn off at the bottom. Distillable heavy oil components can be separated in a subsequent stripper, combined with the overhead product of the hot separator and the components can be provided for further processing. The residue that remains behind in the stripper can be recycled for renewed pyrolysis in the low temperature carbonizing drum.

A gas phase hydrogenation for further treatment of the reaction products, which have been drawn off at the head of the hot separator in gaseous or vaporous state, can be directly coupled to the above described liquid phase hydrogenation without re-heating or pressure release.

Hydrogen-containing process gas and/or fresh hydrogen are added as hydrogenating gas. The gas phase catalyst is, for example, any conventional or commercially available refining contact catalyst.

After passing through the gas phase hydrogenation, the product streams are condensed by means of intensive heat exchange and separated into a liquid phase and a gas phase in a high pressure cold separator. A portion of the remaining gas phase is recycled into the liquid phase hydrogenation as circulating gas. The raffinate is further separated by means of distillation. The waste water is removed via a depressurization step, and it is free of polycyclic aromatic hydrocarbons.

Under the present conditions of the hydrogenation pressures and temperatures ranging from 250° C. to 500° C., the polycyclic, partially chlorinated aromatic hydrocarbons, which are otherwise thermally relatively stable, are also converted into saturated hydrocarbons.

The process of the present invention offers the possibility of treating problem wastes and, in addition to this, recovering usable products.

Other features of the invention will become apparent in the course of the following description of exemplary embodiments which are given for illustration of the invention and are not intended to be limiting thereof.

EXAMPLES

1. Soil from a refinery fuel depot that is contaminated with crude oil and contains 12% by weight of organic material is pyrolyzed in an indirectly heated rotary drum at a temperature of 550° C. After a residence time of approximately 1 hour in the drum, a solid pyrolysis residue is obtained that is free of organic material and is non-leachable with water. In addition to a low temperature gas (approximately 1% based on the feedstock), a low temperature tar is also obtained in a quantity of 10%, which has the following characteristics:

| sulfur content | 3.2% |
| nitrogen content | 0.8% |
| carbon black, dust content | 12% |
| content of non-boiling components | 45% |

The thus-obtained low temperature tar, which contains 1000 ppm of polychlorinated biphenyls (PCB) and contains 88% of material boiling above 350° C., is hydrogenated in the liquid phase at a temperature of 450° C., a pressure of 220 bar, a hydrogen/oil ratio of 2000 1/kg and a specific throughput of 1 kg/1 h·1% of finely ground low temperature coke is added as the additive.

To neutralize the hydrochloric acid that is formed, a twofold stoichiometric quantity of alkali is added to the feedstock. The organically bonded chlorine is quantitatively converted to sodium chloride and removed with the additive. However, it is also possible to inject the quantity of alkali to be added as an aqueous solution or together with water into the effluent from the liquid phase reaction and downstream with respect to the hot separator, for example, into the supply lines of the high pressure cold separator. The formation of hydrocarbon gases amounts to 4%, and the hydrogen consumption is 60 1/kg; 55% of the part that evaporates above 350° C. is converted into naphtha and a middle distillate. The total liquid product has the following characteristics:

| PCB content | <0.1 ppm (detection limit) |
|---|---|
| sulfur content | 0.1% |
| nitrogen content | 0.1% |
| heavy metal content | <1 ppm (detection limit) |

The process water of the liquid phase hydrogenation is free of PCB (detection limit 0.1 ppm) and heavy metals (detection limit 1 ppm).

2. Dried sewage sludge with 76% organic content is pyrolyzed in an indirectly heated rotary drum at a temperature of 500° C. After a residence time of approximately 1 hour in the drum, a solid pyrolysis residue is obtained that comprises inorganic components from the sewage sludge and the coke that is formed. In addition to 24% by weight of low temperature gas, 22% by weight of low temperature tar is obtained that has the following characteristics:

| tar + dust | 60% |
|---|---|
| aromatics | 19% |
| aliphatics | 21% |

The low temperature tar with a phenol content of 15% and a polycyclic aromatic hydrocarbon (PAH) content of 10% is hydrogenated in the liquid phase at a pressure of 280 bar, a temperature of 470° C., a hydrogen/oil ratio of 2000 1/kg and a specific throughput of 1 kg/1·h in the liquid phase. 1% of finely ground low temperature coke is added as the additive.

The head vapors of the hot separator and the distillate of the hot separator bottoms are further treated at a temperature of 390° C. and a specific reactor throughput of 0.5 kg/kg·h in a gas phase hydrogenation with a commercially available refinery contact catalyst under about the same pressure or a pressure that is by a maximum of 5 to 20 bar different from the pressure of the liquid phase hydrogenation. The remaining hydrogenation residue of the liquid phase hydrogenation is introduced to the low temperature carbonizing drum for renewed pyrolysis.

Following the gas phase hydrogenation, the process water is free of phenol and free of polycyclic aromatic hydrocarbons (PAH's). The total liquid product has the following characteristics:

| PAH content | <0.1 ppm |
|---|---|
| phenol content | <10 ppm |
| sulfur content | <10 ppm |
| nitrogen content | <10 ppm |

The pyrolysis oil is subjected to a combined liquid and gas phase hydrogenation. The pyrolysis gas is introduced directly to the gas phase reactor.

Obviously, numerous modifications and variations of the present invention are possible in light of the above teachings. It is therefore to be understood that within the scope of the appended claims, the invention may be practiced otherwise than as specifically described herein.

What is new and desired to be secured by the Letters Patent of the United States is:

1. A process for treating waste, comprising the step:
   (i) hydrogenating, in the liquid phase, a liquid product of low temperature carbonization of a waste, in the presence of 0.5 to 5% by weight of a catalyst, based on the total weight of the hydrogenation mixture, under a hydrogen pressure of 20 to 325 bar, at a temperature of 250 to 500° C., and with a gas to liquid ratio of 100 to 3,000 Nm$^3$/t, wherein said liquid product of low temperature carbonization contains at least one member selected from the group consisting of polycyclic aromatic hydrocarbons and chlorinated hydrocarbons.

2. The process of claim 1, wherein said hydrogenating is conducted under a hydrogen pressure of 150 to 200 bar.

3. The process of claim 1, wherein said hydrogenating is conducted at a temperature of from 400 to 490° C.

4. The process of claim 3, wherein said hydrogenating is conducted at a temperature of from 430 to 480° C.

5. The process of claim 1, wherein said catalyst is one member selected from the group consisting of low temperature coke and brown coal coke.

6. The process of claim 5, wherein said catalyst is low temperature coke.

7. The process of claim 6, wherein said low temperature coke is impregnated with a catalytically active metal or salt thereof.

8. The process of claim 1, wherein said liquid product is produced by low temperature carbonizing in a low temperature carbonization drum.

9. The process of claim 8, wherein said liquid product is produced by low temperature carbonizing in a low temperature carbonization drum with indirect heating.

10. The process of claim 1, wherein said liquid product is produced by low temperature carbonizing in the presence of a basic additive.

11. The process of claim 10, wherein said basic additive is lime.

12. The process of claim 1, wherein said waste contains at least one member selected from the group consisting of plastic waste, hydrocarbon-loaded residues, contaminated soil, a biomass, and sludge.

13. A process for treating waste, comprising the steps:
   (i) low temperature carbonizing a waste, to obtain a liquid product; and
   (ii) hydrogenating, in the liquid phase, said liquid product in the presence of 0.5 to 5% by weight of a catalyst, based on the total weight of the hydrogenating mixture, under a hydrogen pressure of 20 to 325 bar, at a temperature of 250 to 500° C., and with a gas to liquid ratio of 100 to 3,000 Nm$^3$t, wherein said liquid product contains at least one member selected from the group consisting of polycyclic aromatic hydrocarbons and chlorinated hydrocarbons.

14. The process of claim 13, wherein said hydrogenating is conducted under a hydrogen pressure of 150 to 200 bar.

15. The process of claim 13, wherein said hydrogenating is conducted at a temperature of from 400 to 490° C.

16. The process of claim 15, wherein said hydrogenating is conducted at a temperature of from 430 to 480° C.

17. The process of claim 13, wherein said catalyst is low temperature coke.

18. The process of claim 17, wherein said low temperature coke is impregnated with a catalytically active metal or salt thereof.

19. The process of claim 13, wherein said waste contains at least one member selected from the group consisting of plastic waste, hydrocarbon-loaded residues, contaminated soil, a biomass, and sludge.

20. The process of claim 13, wherein said low temperature carbonizing is carried out in a low temperature carbonization drum with indirect heating.

21. The process of claim 1, wherein said chlorinated hydrocarbon is a polychlorinated biphenyl.

22. The process of claim 13, wherein said chlorinated hydrocarbon is a polychlorinated biphenyl.

23. A process for treating waste, comprising the step:
 (i) hydrogenating, in the liquid phase, a liquid product of low temperature carbonization of a waste, in the presence of 0.5 to 5% by weight of a catalyst, based on the total weight of the hydrogenation mixture, under a hydrogen pressure of 20 to 325 bar, at a temperature of 250 to 500° C., and with a gas to oil ratio of 100 to 3,000 $Nm^3$t, wherein said liquid product of low temperature carbonization is a tar.

24. A process for treating waste, comprising the steps:
 (i) low temperature carbonizing a waste, to obtain a liquid product; and
 (ii) hydrogenating, in the liquid phase, said liquid product in the presence of 0.5 to 5% by weight of a catalyst, based on the total weight of the hydrogenating mixture, under a hydrogen pressure of 20 to 325 bar, at a temperature of 250 to 500° C., and with a gas to oil ratio of 100 to 3,000 $Nm^3/t$, wherein said liquid product is a tar.

* * * * *